US009001659B2

(12) United States Patent  (10) Patent No.: US 9,001,659 B2
Sun et al.  (45) Date of Patent: Apr. 7, 2015

(54) OPENFLOW ENABLED WIFI MANAGEMENT ENTITY ARCHITECTURE

(71) Applicant: FutureWei Technologies, Inc., Plano, TX (US)

(72) Inventors: Sheng Sun, Kanata (CA); Yapeng Wu, Nepean (CA); Wen Tong, Ottawa (CA); Peiying Zhu, Kanata (CA); Hang Zhang, Nepean (CA); Kwok Shum Au, Shenzhen (CN); Osama Aboul-Magd, Kanata (CA); Junghoon Suh, Kanata (CA)

(73) Assignee: Futurewei Technologies, Inc., Plano, TX (US)

( * ) Notice: Subject to any disclaimer, the term of this patent is extended or adjusted under 35 U.S.C. 154(b) by 157 days.

(21) Appl. No.: 13/746,120

(22) Filed: Jan. 21, 2013

(65) Prior Publication Data

US 2014/0204746 A1  Jul. 24, 2014

(51) Int. Cl.
*H04W 28/08*  (2009.01)
*H04W 28/02*  (2009.01)

(52) U.S. Cl.
CPC .......... *H04W 28/08* (2013.01); *H04W 28/0247* (2013.01)

(58) Field of Classification Search
CPC .......................... H04W 28/08; H04W 36/0022
USPC .......................... 370/235, 328, 329, 331, 338
See application file for complete search history.

(56) References Cited

U.S. PATENT DOCUMENTS

| 8,412,207 | B2* | 4/2013 | Ohman et al. ................ 455/445 |
| 2004/0044887 | A1* | 3/2004 | Park et al. ........................ 713/1 |
| 2005/0025164 | A1* | 2/2005 | Kavanagh et al. ............ 370/401 |
| 2006/0130136 | A1* | 6/2006 | Devarapalli et al. ........... 726/15 |
| 2007/0047538 | A1* | 3/2007 | Rosner et al. ................. 370/379 |
| 2007/0173283 | A1* | 7/2007 | Livet et al. ................ 455/552.1 |
| 2010/0054207 | A1 | 3/2010 | Gupta et al. |
| 2010/0103829 | A1* | 4/2010 | Murzeau et al. ............. 370/252 |
| 2011/0271007 | A1* | 11/2011 | Wang et al. ................... 709/238 |

(Continued)

FOREIGN PATENT DOCUMENTS

CN  101541053  9/2009

OTHER PUBLICATIONS

"3rd Generation Partnership Project; Technical Specification Group Services and System Aspects; 3GPP System to Wireless Local Area Network (WLAN) Interworking; System Description (Release 11)," Technical Specification, 3GPP TS 23.234, V11.0.0, Sep. 2012, 84 pages.

(Continued)

*Primary Examiner* — Brian D Nguyen
(74) *Attorney, Agent, or Firm* — Slater & Matsil, L.L.P.

(57) ABSTRACT

System and method embodiments are provided to improve offloading traffic from mobile operators networks via a WiFi network. The embodiments also include schemes to offload traffic between WiFi networks. The embodiments include a network component comprising a WiFi management entity (WiME) configured to serve as an anchor point for a user device at a WiFi network and communicate with a management entity at a wireless network using OpenFlow protocol to handle a plurality of control and mobility functionalities for traffic in the WiFi network, wherein the control and mobility functionalities include offloading traffic for the user device from the wireless network to the WiFi network.

26 Claims, 9 Drawing Sheets

(56) References Cited

U.S. PATENT DOCUMENTS

| | | |
|---|---|---|
| 2012/0201137 A1 | 8/2012 | Le Faucheur et al. |
| 2013/0003701 A1 | 1/2013 | Koyanagi et al. |
| 2014/0105062 A1* | 4/2014 | McDysan et al. ............ 370/254 |
| 2014/0160937 A1* | 6/2014 | Richards ...................... 370/236 |
| 2014/0169330 A1* | 6/2014 | Rommer et al. ............. 370/331 |

OTHER PUBLICATIONS

"3rd Generation Partneship Project; Technical Specification Group Services and System Aspects; Architecture Enhancements for Non-3GPP Accesses (Release 11)," Technical Specification, 3GPP TS 23.402, V11.4.0, Sep. 2012, 252 pages.

Calhoun, P., et al., "Control and Provisioning of Wireless Access Points (CAPWAP) Protocol Specification," Network Working Group, Mar. 2009, 156 pages.

Calhoun, P., et al., "Control and Provisioning of Wireless Access Points (CAPWAP) Protocol Binding for IEEE 802.11," Network Working Group, Mar. 2009, 77 pages.

International Search Report, PCT/CN2014/070892, date of mailing Apr. 3, 2014.

* cited by examiner

OPENFLOW ENABLED WIFI MANAGEMENT ENTITY ARCHITECTURE

TECHNICAL FIELD

The present invention relates to the field of wireless communications and wireless networks architecture design and optimization, and, in particular embodiments, to systems and methods for implementing an OpeneFlow enabled WiFi management entity architecture.

BACKGROUND

Mobile network operators are encountering growing demand for data usage on mobile devices, such as smartphones and other mobile devices. This trend is increasing as next generation cellular systems are deployed, such as $4^{th}$ Generation (4G) and Long Term Evolution (LTE) systems. The resulting demand for data is causing bottlenecks in operators' backhaul or core networks. WiFi data offloading is being used as a solution to relieve the upgrade of backhaul or core networks (to save cost), where more demanding data traffic (e.g. video and data downloading from the Internet) is offloaded through WiFi networks (e.g., Hot Spots) without passing through the operators' backhaul or core networks. However, this prevents operators from imposing network policy and charging (or billing) rules and other control functions and restrictions on such traffic. Offloading traffic in an autonomous (automatic) manner between a cellular access/core network and a WiFi network, for example to achieve load balance between networks, is desired. This can be achieved by statically mapping traffic (or traffic types) for offloading between the networks. However, the static configuration approach can be limiting or inefficient for some scenarios, such as for achieving intelligent and smooth data offloading and seamless device mobility (seamless handoff).

SUMMARY

In one embodiment, a network component includes a WiFi management entity (WiME) configured to serve as an anchor point for a user device at a WiFi network and communicate with a management entity at a wireless network using OpenFlow protocol to handle a plurality of control and mobility functionalities for traffic in the WiFi network, wherein the control and mobility functionalities include offloading traffic for the user device from the wireless network to the WiFi network.

In another embodiment, a network component includes a management entity configured to serve as an anchor point for a user device at a wireless network and communicate with a WiME at a WiFi network using OpenFlow protocol to handle a plurality of control and mobility functionalities for traffic in the WiFi network, wherein the control and mobility functionalities include offloading traffic for the user device from the wireless network to the WiFi network.

In another embodiment, a method that implemented at a WiME for managing traffic in one or more wireless networks includes receiving via OpenFlow protocol update information from a user device to start a communication session with a WiFi network, wherein the user device was in communications with a wireless network, exchanging via the OpenFlow protocol synchronization information with a management entity in the wireless network to offload communications for the user device from the wireless network, and sending via the OpenFlow protocol provisioning information to an attachment point (AP) in the WiFi network to configure the AP to handle the communication session for the user device.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

Figure 1:
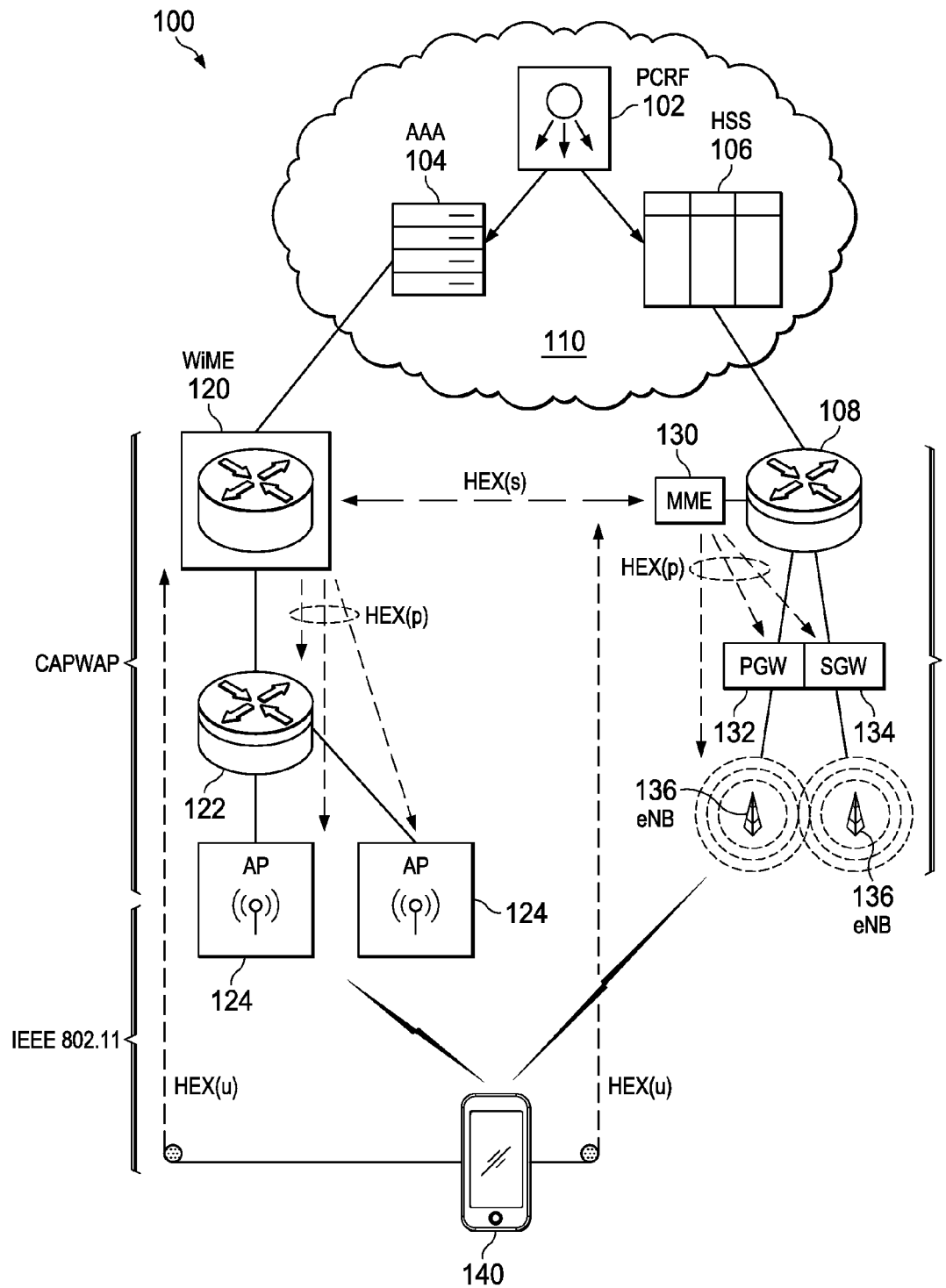
FIG. 1 illustrates an embodiment system for offloading traffic between cellular and WiFi networks.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In some WiFi offloading architecture models, traffic is offloaded from a mobile operator's core and cellular access networks via a WiFi network without involving the operator's core and cellular access networks. The offloaded traffic is transferred to/from the Internet via the WiFi network without passing through the operator's core and cellular access networks. A drawback of this model is that the traffic is offloaded without regard to whether some of that traffic may be intended for routing/switching in the core network. In another model, the traffic is offloaded from a cellular access network via a WiFi network using an Interworking-Wireless Local Area Network (I-WLAN), where established policy and charging rules can be applied to traffic. The traffic is then sent to the Internet via the operator's core network. In this case, the WiFi offloaded traffic still passes through the operator's core network, which may not reduce traffic load on the core network. In a third model, a gateway (e.g., at the WiFi network) selectively offloads some of the traffic directly to the Internet and sends other WiFi traffic through the core network to implement operator's policy and other rules.

Disclosed herein are systems and methods to improve offloading traffic from mobile operators networks via a WiFi network. The systems and methods also include schemes to offload traffic between WiFi networks. The traffic comprises data traffic that is transferred to/from the Internet or other networks. The systems and methods use WiFi based offloading architectures that do not have the limitations or drawbacks of the models above. The architectures allow the operators to implement established policy, charging, and other established rules rules on the offloaded traffic without passing the traffic through the operator's core network. Other control functions can also be implemented to achieve intelligent and smooth data offloading between networks and smooth device mobility (smooth handoff). The architectures use an OpenFlow protocol to enable intelligent and autonomous system provisioning and WiFi traffic offloading.

The architectures include an anchor point between the WiFi and other wireless networks, referred to herein as a WiFi Management Entity (WiME). The WiME is configured to implement control and mobility functionalities for WiFi offloaded traffic. The WiME comprises an OpenFlow controller that communicates with a mobility management entity (MME) at a cellular access network (or another WiME in a second WiFi network) to implement mobility and control functionalities equivalent to the MME in the cellular access network. The functionalities include offloading functionalities and policy/charging rules functionalities that are established by the operator and implemented without passing the offloaded traffic through the operator's core network. In scenarios for offloading traffic between WiFi networks, two peer OpenFlow controllers at two peer WiMEs for different WiFi networks can communicate to implement the appropriate functionalities.

FIG. 1 illustrates an embodiment system 100 for offloading traffic between cellular and WiFi networks. The system 100 comprises a cellular access network 114 (e.g., 3G/4G or LTE) and a WiFi network 112, both coupled to a core network 110. The core network 110 and the cellular access network 114 may be operated by the same mobile operator. The core network 110 comprises a Home Subscriber Server (HSS) 106 and an Authentication, Authorization, and Accounting (AAA) server 104, both coupled to a policy and charging rules function (PCRF) 102 that can at a network component or node. The AAA server 104 provides access control policies for users, including authenticating and authorizing users and accounting for user traffic in the WiFi network 112. The HSS 106 is a central database for subscriber information and can serve similar functions as the AAA server 104 for the cellular access network 114. The PCRF 102 communicates with the HSS 106 and the AAA server 104 to enforce communication policy and charging rules on users' traffic.

The cellular access network 114 comprises a serving node 108, a MME 130, a packet data network gateway (PGW) 132, a serving gateway 134, and a plurality of radio access nodes (RANs) 136, e.g., a plurality of Evolved Universal Terrestrial Radio Access Network (E-UTRAN) Node Bs (eNBs). The serving node 108 is coupled to the HSS 106 and forwards user traffic to the core network 110 and/or between the RANs 136, via the PGW 132 and the SGW 134. The PGW 132 and SGW 134 forward traffic between the RANs 136 and the serving node 108. The RANs 136 allow user equipments (UEs) or stations (STAs) 140 (e.g., a smartphone or other mobile devices) wireless access to the cellular access network 114. Typically, the term UE is associated with cellular networks and the term STA is associated with WiFi networks. However, the two terms are used interchangeably herein to refer to any mobile device that uses both cellular and WiFi technologies/interfaces to connect to cellular and WiFi networks.

The MME 130 is coupled to the serving node 108 and is an anchor point between the cellular access network 114 and the core network 110. The MME 130 handles mobility and control functionalities, such as resource allocation, security binding, and mobility control. The MME is a component of the System Architecture Evolution (SAE) for core network architectures. The MME 130 is responsible for idle mode UE tracking for tracking and paging procedure including retransmissions. The MME 130 is also involved in the bearer activation/deactivation process and is responsible for choosing the SGW 134 for a UE 140 at the initial attach time and at time of handover. The MME 130 is further responsible for authenticating the user (by interacting with the HSS 106). The MME 130 terminates Non Access Stratum (NAS) signaling and it is also responsible for generation and allocation of temporary identities to the UEs 140. The MME 130 is the termination point in the network for ciphering/integrity protection for NAS signaling and handles the security key management. Lawful interception of signaling is also provided by the MME 130. The MME 130 checks the authorization of the UE 140 and enforces UE roaming restrictions. The MME 130 can also provide a control plane function for mobility between LTE and 2G/3G access networks.

The WiFi network 112 comprises a WiME 120, a gateway 122, and a plurality of access points (APs) 124. The gateway 122 is coupled to the WiME 120 and forwards user traffic to the Internet (not shown) and/or other networks, which can include the core network 110. The APs 124 allow the UEs or STAs 140 wireless access to the Internet and/or other networks. The APs 124 communicate with the STAs or UEs 140 using IEEE 802.11 protocols. The UEs or STAs 140 on the move can switch between different APs 124 and/or RANs 136 via a handoff procedure. The UEs or STAs 140 can also offload some of the traffic between the APs 124 and the RANs 136. For instance, a UE or STA 140 can offload at least some of the data traffic from a RAN 136 to an AP 124. As such, the offloaded data traffic may be routed to the Internet via the WiFi network 112 without passing through the cellular access network 114 and the core network 110.

The WiME 120 is configured to serve as an anchor point between the WiFi network 112 and the core network 110 and handles equivalent or similar functionalities as the MME 130 for the WiFi network 112. The WiME 120 handles mobility and control functions, including signaling, load balancing, roaming, authentication, provisioning, and other functionalities described below. The WiME 120 also enables policy and charging rules enforcement for user traffic offloaded onto the WiFi network 112. The WiME 120 comprises an OpenFlow controller that enables communications with the MME 120 for implementing the different functionalities, such as pre-established authentication, Open Radio resource planning, and other functionalities of the WiME 120.

The OpenFlow is a Layer 2 communications protocol that gives access to the forwarding plane of a network switch or router over the network. The OpenFlow protocol allows determining a path of traffic through the routers/switches of the network using software that runs on multiple routers. The OpenFlow protocol separates the control layer (or function) from the forwarding layer, enables more sophisticated traffic management than is feasible using access control lists (ACLs) and routing protocols, and enables Software Defined Networking (SDN).

Each of the WiME 120 and the MME 130 comprises an OpenFlow controller that communicates with the peer OpenFlow controller at the other management entity to enable the functionalities of the WiME 120. As such, the WiME 120 can implement equivalent or similar functionalities as the MME 130 for offloaded traffic in the WiFi network 112, such as to support PCRF, HSS, and AAA functions. The WiME 120 communicates with the MME 130 and other components of the system 100 to implement control, mobility, policy and charging rule functionalities using a set of protocols, referred to herein as Hermex (or Hex) protocols, that are based on the OpenFlow protocol.

The HEX protocols are implemented by the OpenFlow controllers at the WiME 120 and the MME 130. The HEX protocols include a HEX protocol for updating (HEX(u)), which allows the WiME 120 and the MME 130 to receive updates from the UEs/STAs 140, such as information about UE/STAs' resources, locations, traffic, traffic conditions, and other information. The HEX protocols include a HEX protocol for provisioning (HEX(p)), which allows the WiME 120 to provision the APs 124 and allows the MME 130 to provision the RANs 136 and the PGW 132/SGW 134 to handle the mobility and traffic offloading activities of the UEs/STAs 140. The HEX protocols also include a HEX protocol for synchronizing (or HEX(s)), which allows the WiME 120 and the MME 130 to exchange and synchronize control and management information, including the updates from the UEs/STAs 140. Additionally, the WiME 120 communicates with the APs 124 using a control and provisioning of wireless access points (CAPWAP) protocol. The OpenFlow controller of the WiME 120 is configured to support the CAPWAP communications.

The functionalities of the WiME 120 include forming AP clusters, e.g., at a network discovery and setup phase. During this phase, the WiME 120 performs control plan functions for data plane optimization, such as for determining an offloading strategy. The functionalities also include network signaling security, where the WiME 120 provides admission control and security control for implementing the HEX protocols above. Network security includes authentication, determining integrity, and confidentiality protection of the HEX protocols. The functionalities also include backhaul network selection for roaming mobility control, including backward network attachment/detachment. Another functionality of the WiME 120 is session control, including procedures for handling Evolved Packet System (EPS) bearer contexts and control of user plane bearers and IP flows. The procedures are used by the UEs/STA 140 to request/release the resources for an EPS bearer. The procedures can also be used by an Evolved Packet Core (EPC) to manage EPS bearer.

The WiME 130 also implements load balancing and roaming functionalities. The WiME 130 can implement a plurality of procedures for different roaming scenarios defined for different user cases. The roaming procedures enforce network selection and discovery procedures and roaming agreement. The WiME functionalities also include cluster zone update (CZU) list management, including procedures for enabling the STAs 140 to update their location. Another WiME functionality is STA authentication, including STA cipher generation and distribution. This functionality also includes procedures for UE over the air confidentiality and integrity protection.

The functionalities further comprise a provisioning message transfer function, including selection of an appropriate AP 124. The provisioning function optimizes AP selection based on conditions, such as load, traffic, and/or other network conditions. Traffic cap provisioning (TCP) is another functionality of the WiME 120 that enables intelligent traffic offloading in sensing a particular UE or STA 140, sensing an application that overuses bandwidth, and/or sensing other conditions for triggering traffic offloading. The TCP functionality includes defining interactivity between the WiME 120 and the MME 130 entities. The UE/STA traffic offloading (e.g., from the cellular access network 114 to the WiFi network 112) can be triggered or initiated by the STA/UE 140, the PCRF 102, the HSS 106, the AAA server 104, or other components of the system 100.

The traffic offloading model or architecture of the system 100 is based on using the WiME 120 as an anchor point at the wireless network 112, the MME 130 as an anchor point at the cellular access network 114, and enabling both to communicate for offloading traffic between the WiFi network 112 and the cellular core/access networks while marinating the policy and charging rules/functions (and optionally other control functions/rules) of the core network's operator. The architecture is further based on implementing the HEX protocols using the OpenFlow controllers at the WiME 120 and the MME 130 to support the WiME functionalities above. This offloading architecture or model is also referred to herein as the Hermex or HEX architecture.

The HEX architecture also separates physical (PHY) layer functions and Media Access Control (MAC) layer functions (of the WiFi network 112) into different management entities, i.e., the WiME 120 and the AP 124. The MAC layer functions include the WiME functionalities above (e.g., for security, flow control, etc.) that are implemented at the WiME 120, while the PHY layer functions are implemented at the AP 124. Although shown as a separate component of the system 100, the WiME 120 can be implemented as a software component that is co-located with the AP 124, e.g., at the same network component. The communications between the AP 124 and the WiME 120 can be implemented using the CAPWAP protocol (e.g., as described in the IETF RFC 5415) and the CAPWAP Binding protocol (e.g., as described in IETF RFC 5416).

Figure 2:
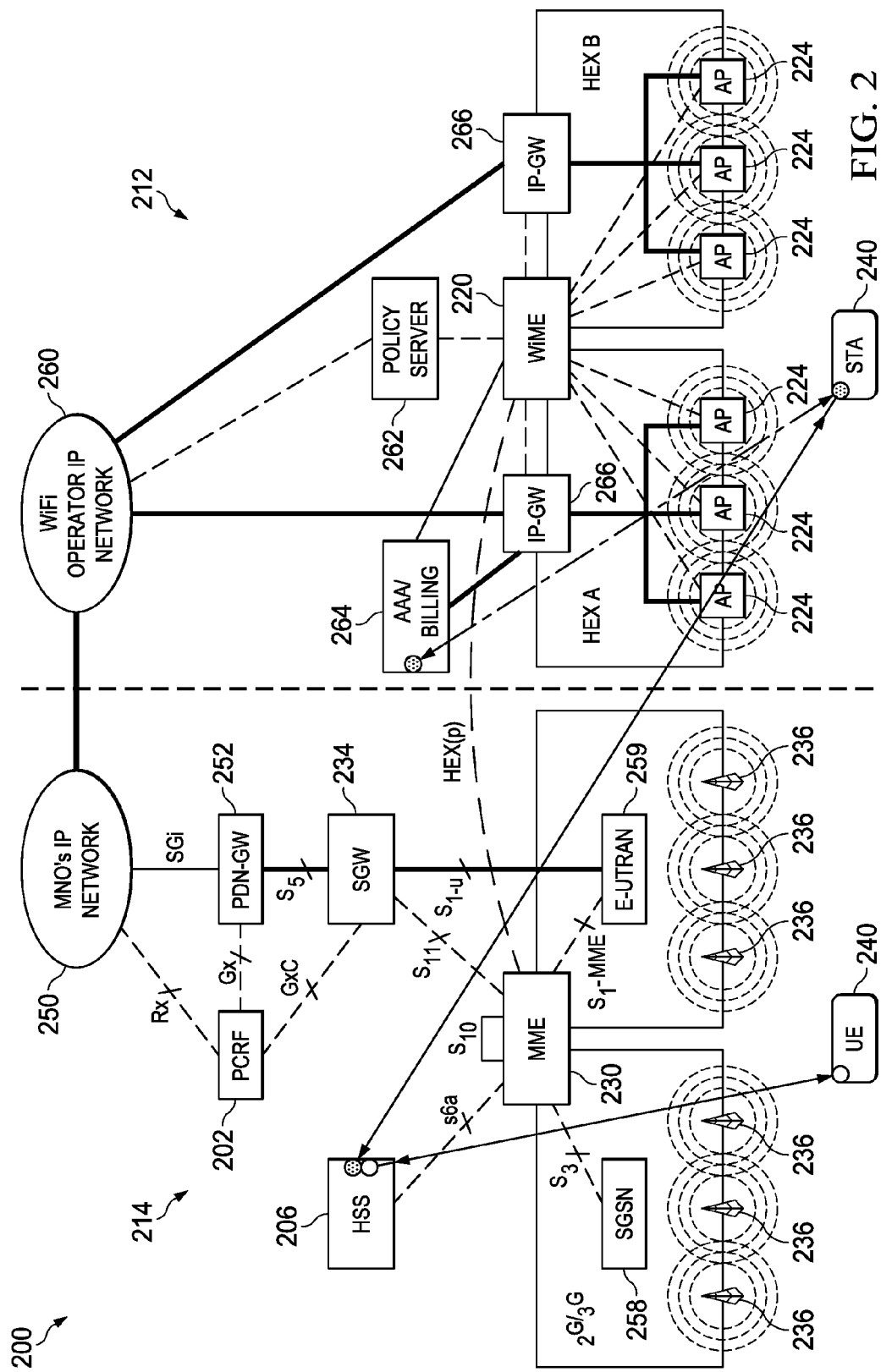
FIG. 2 illustrates another embodiment system for offloading traffic between cellular and WiFi networks.

FIG. 2 illustrates an embodiment of another system 200 for offloading traffic between cellular and WiFi networks based on the HEX architecture. The system 200 comprises one or more cellular access networks 214 coupled to a mobile operator core network 250 (e.g., an IP network) and one or more WiFi networks 212 coupled to a WiFi operator core network 260 (e.g., another IP network). The cellular access networks 214 comprise a PCRF 202 and a public data network gateway (PDN-GW) 252 both coupled to the mobile operator core network 250. The cellular access networks 214 also comprise a HSS 206 and a SGW 234 coupled to the PDN-GW 252, and a MME 230 coupled to both the HSS 206 and the SGW 234. The PDN-GW 252 and the SGW 234 forward traffic between the cellular access networks 214 and the mobile operator core network 250.

The cellular access networks 214 may include an E-UTRAN network and a general packet radio service (GPRS) network, both coupled to the MME 230. The E-UTRAN network comprises an E-UTRAN node 259 that handles a plurality of RANs 236 (i.e., eNBs). The GPRS network comprises a serving GPRS support node (SGSN) node 258 that handles other RANs 236. The RANs 236 allow UEs 240 access to the cellular access networks 214. Components of the cellular access network system 214 (including the cellular access networks 270) are configured similar to corresponding components of the system 100. FIG. 2 also shows some of the standard links or interfaces (SGi, Gx, S5, S11, etc.) that can be used to allow communications between the various components of the system 200.

The WiFi networks 212 comprises a policy server 262 coupled to the WiFi operator core network 260, and a WiME 220 coupled to the policy server 220. The WiME 220 communicates with the policy server 262 to enforce communication policy rules on users' traffic. Each WiFi network 212 is coupled to the WiME 220 via a corresponding IP gateway (IP-GW) 266. Each IP-GW 266 in a WiFi network 212 is coupled to a plurality of corresponding APs 224 and forward traffic between the APs 224 and the WiFi operator core network 260. The WiME 220 and one or more IP-GWs 266 are coupled to an AAA/Billing server 264. The WiME 220 communicates with the AAA/Billing server 264 and the IP-GWs 266 to provide authentication, authorization, accounting and enforce billing rules on users' traffic. The APs 224 allow STAs 240 access to the WiFi networks 212. Components of the WiFi networks 212 are configured similar to corresponding components of the system 100. The various components in the system 200 may be coupled to each other as shown in FIG. 2.

The STAs or UEs 240 can access both the cellular access networks 214 (via the RANs 236) and the WiFi networks 212 (via the APs 224), for example to offload traffic between the cellular access networks 214 and the WiFi networks 212. As such, the offloaded traffic is passed through the WiFi operator's network 260 instead of the mobile operator core network 250, e.g., to reduce load on the mobile operator core network 250. The traffic can be offloaded while enforcing policy and charging rules of the mobile operator core network 250. Based on the HEX architecture, the WiME 220 acts as an anchor point for the WiFi networks 212 and the MME 230 acts as an anchor point for the cellular access networks 214 and communicate with each other to offload traffic from the cellular access networks 214 and the mobile operator core network 250 to the WiFi networks 212 and the WiFi operator core network 260. The WiME 220 and the MME 230 comprise OpenFlow controllers that communicate with each other and with other components using the HEX protocols to support the WiME functionalities above. The HEX protocols are based on or configured in accordance with or using the OpenFlow communications.

Figure 3:
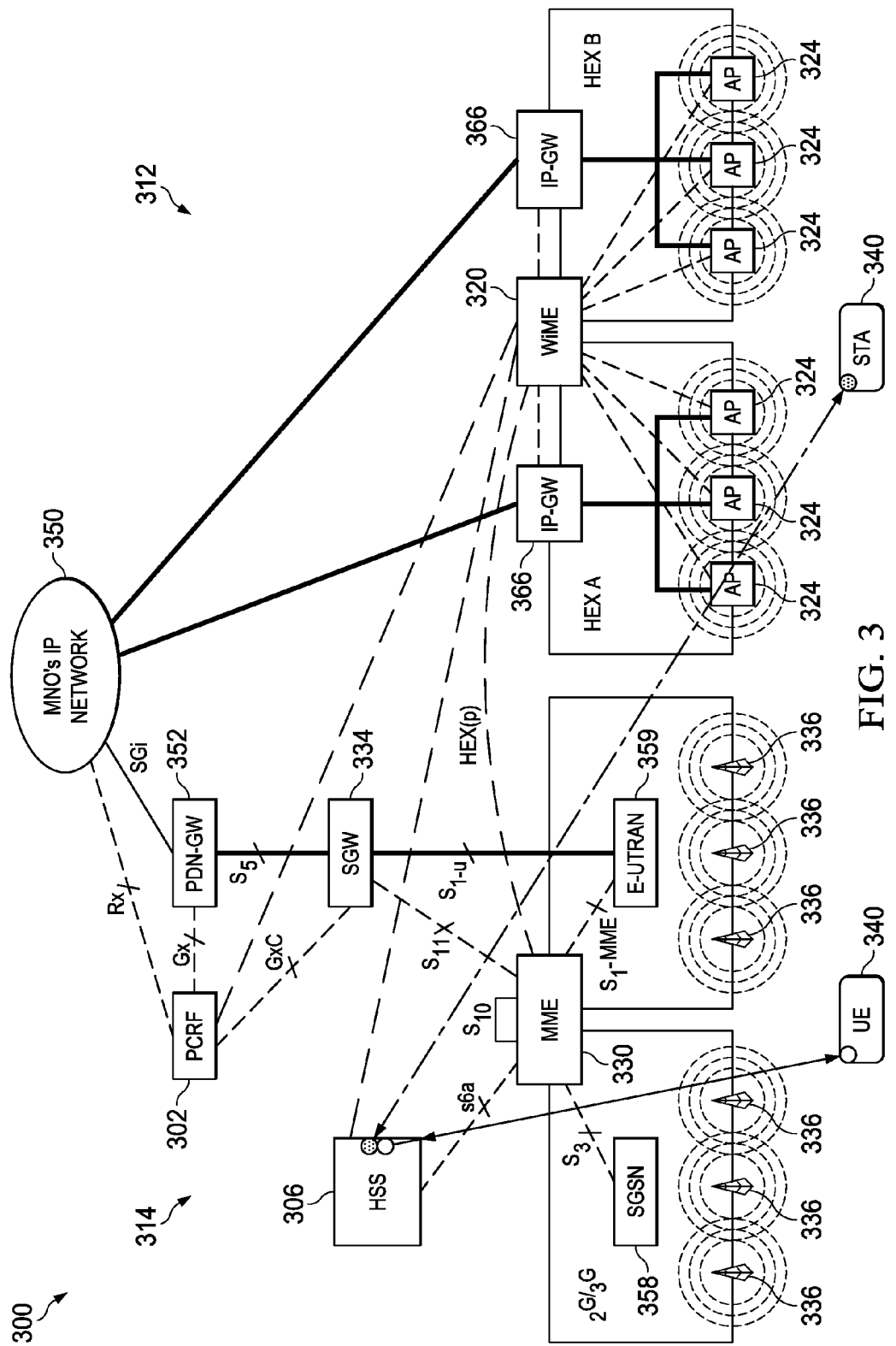
FIG. 3 illustrates another embodiment system for offloading traffic between cellular and WiFi networks.

FIG. 3 illustrates an embodiment of another system 300 for offloading traffic between cellular and WiFi networks based on the HEX architecture. The system 300 comprises one or more cellular access networks 314 and one or more WiFi networks 312, all coupled to a mobile operator core network 350 (e.g., an IP network). The cellular access networks 314 comprise a PCRF 302, a PDN-GW 352, a SGW 334, a HSS 306, and a MME 330. The cellular access networks 314 may include an E-UTRAN network comprising an E-UTRAN node 359 with corresponding RANs 336, and a GPRS network comprising a SGSN 358 with corresponding RANs 336. Components of the cellular access network system 314 are configured similar to corresponding components in the system 200. The WiFi networks 312 comprise a WiME 320 coupled to an IP-GWs 366 with corresponding APs 324 in each WiFi network 312. Components of the WiFi network system 312 are configured similar to corresponding components in the system 200. The components of the system 300 may be coupled to each other as shown in FIG. 3.

However, unlike the system 200, the WiFi networks 312 do not comprise a policy server and an AAA/Billing server. Instead, the WiME 320 communicates with the PCRF 302 in the cellular access networks 314 to enforce policy and charging rules on user traffic in the WiFi networks 312. The WiME 320 further communicates with the HSS 306 to obtain subscriber information and authenticate/authorize users in the WiFi networks 312. The WiME 320 and the MME 320 also communicate (via OpenFlow controllers on both sides) and use the HEX protocols to offload traffic between the cellular access networks 314 and the WiFi networks 312 and support the WiME functionalities. The traffic can be offloaded and passed to the Internet or other networks instead of the mobile operator core network 350, while enforcing policy and charging rules of the mobile operator core network 350.

Figure 4:
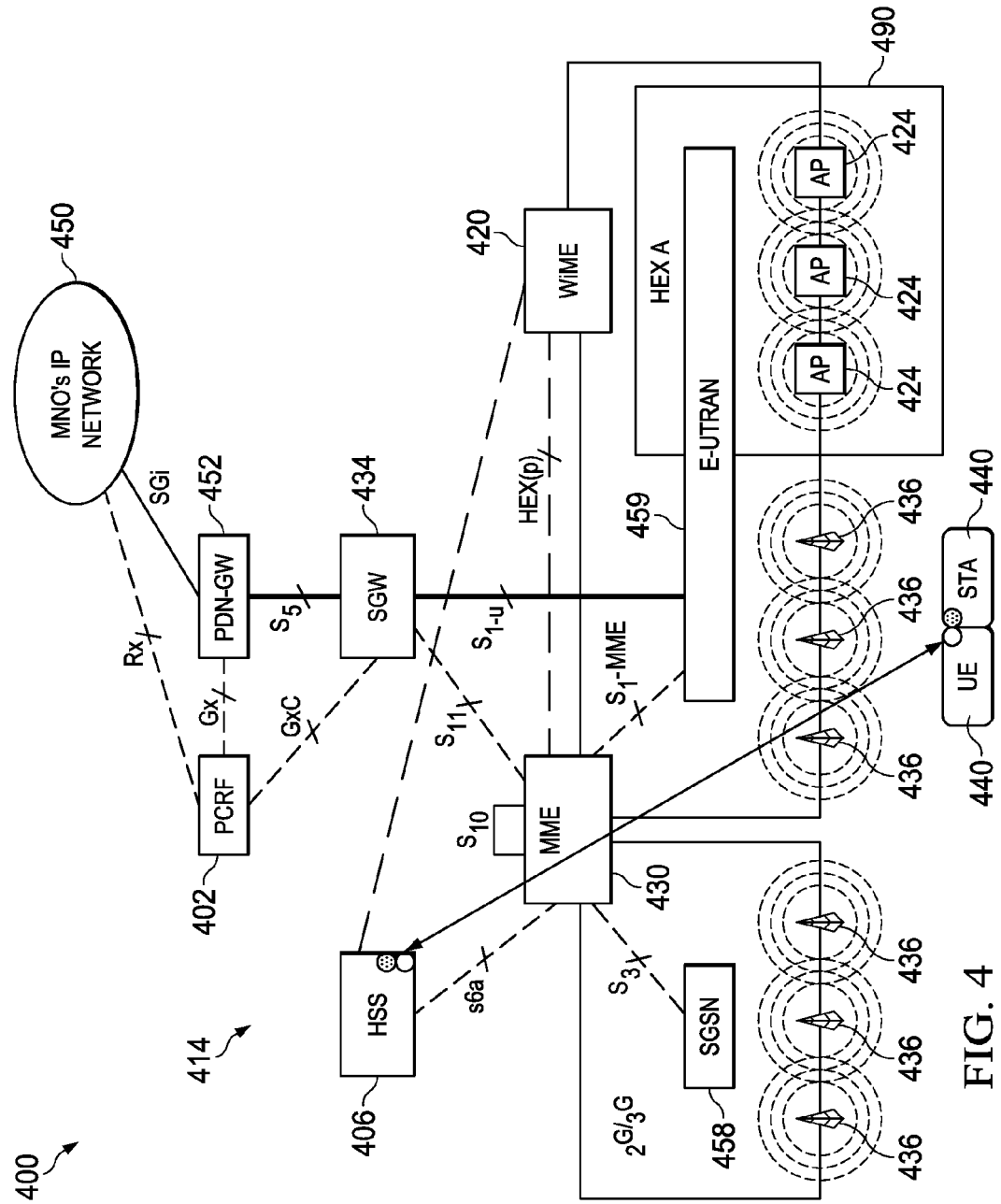
FIG. 4 illustrates another embodiment system for offloading traffic between cellular and WiFi networks.

FIG. 4 illustrates an embodiment of another system 400 for offloading traffic between cellular and WiFi networks based on the HEX architecture. The system 400 comprises one or more cellular access networks 414 that integrate at least one WiFi network 490. The cellular access networks 414 is coupled to a mobile operator core network 450 (e.g., an IP network). The cellular access networks 414 comprise a PCRF 402, a PDN-GW 452, a SGW 434, a HSS 406, and a MME 430. The cellular access networks 414 may include an E-UTRAN network comprising an E-UTRAN node 459 with corresponding RANs 436, and a GPRS network comprising a SGSN 458 with corresponding RANs 436. The E-UTRAN network also includes or is coupled to a WiME 420 and the WiFi network 490, where a plurality of APs 424 can be serviced by the E-UTRAN node 459. Components of the system 400 are configured similar to corresponding components in the systems 200 and 300 and may be coupled to each other as shown in FIG. 4.

However, in the system 400, the WiME 420 communicates with the HSS 406 to obtain subscriber information and authenticate/authorize users in the WiFi network 490. The WiME 420 communicates with the MME 420 (via OpenFlow controllers on both sides) and with other components using the HEX protocols to offload traffic between the cellular portion of the E-UTRAN network and the WiFi network 490 and support the WiME functionalities. The offloaded traffic can be offloaded by the WiFi network 490 and passed to the Internet or other networks instead of the mobile operator core network 450, while enforcing policy and charging rules of the mobile operator core network 450.

Figure 5:
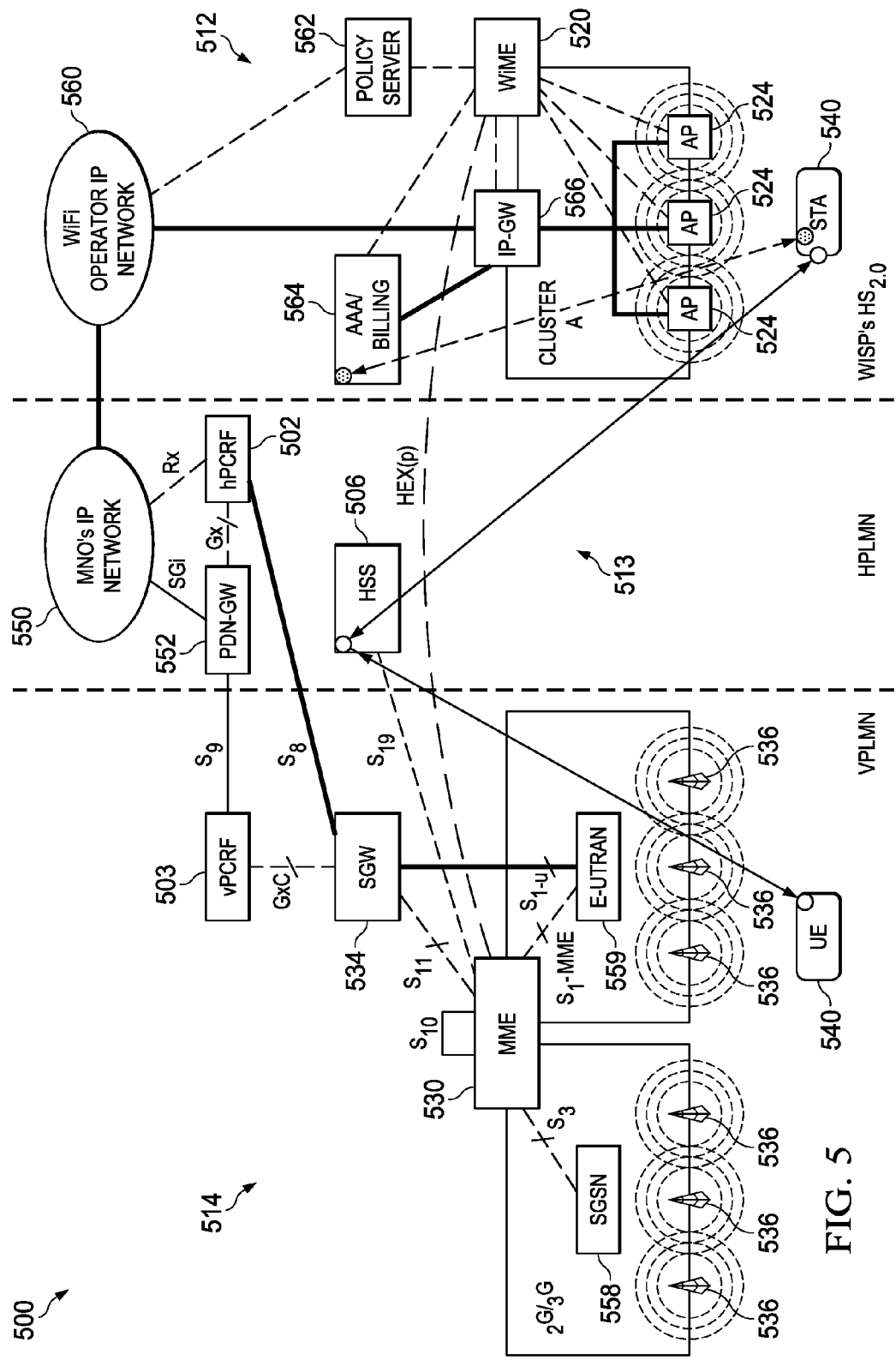
FIG. 5 illustrates another embodiment system for offloading traffic between cellular and WiFi networks.

FIG. 5 illustrates another embodiment system 500 for offloading traffic between cellular and WiFi networks based on the HEX architecture. The system 500 comprises a home cellular access network 513 coupled to a mobile operator core network 550 (e.g., an IP network), one or more visited cellular access networks 514 coupled to the home cellular access network 513, and a WiFi network 512 coupled to a WiFi operator core network 560 (e.g., another IP network). For example, the home cellular access network 513 is a home public land mobile network (HPLMN), the visited cellular access networks 514 are visited PLMNs (VPLMNs), and the WiFi network 512 is a HotSpot 2.0 (HS 2.0).

The home cellular access network 513 comprises a home PCRF (hPCRF) 502, a PDN-GW 552, and a HSS 506. The visited cellular access networks 514 comprise a visiting PCRF (vPCRF) 503, a SGW 534, a MME 530, and a SGW 534 coupled to the hPRCF 502. The visited cellular access networks 514 may include an E-UTRAN network comprising an E-UTRAN node 559 with corresponding RANs 536, and a GPRS network comprising a SGSN 558 with corresponding RANs 536. The RANs 536 communicate with UEs 540. Components of the visited cellular access networks 514 are configured similar to corresponding components in the system 200.

The WiFi network 512 comprises a policy server 562 coupled to the WiFi operator core network 260. The WiFi network 512 also comprises a WiME 220, an IP-GW 566 coupled to an AAA/Billing server 564, and corresponding APs 524. The APs 524 communicate with STAs 540. Components of the WiFi network system 512 are configured similar to corresponding components in the system 200. The components of the system 500 may be coupled to each other as shown in FIG. 5.

The WiME 520 communicates with the policy server 562 (e.g., via the WiFi operator core network 560) to enforce policy rules on users' traffic. The WiME 520 communicates with the AAA/Billing server 564 and the IP-GW 566 to provide authentication, authorization, accounting and enforce billing rules on users' traffic. The WiME 520 communicates with the MME 520 (via OpenFlow controllers on both sides) and with other components using the HEX protocols to offload traffic between the visited cellular access networks 514 and the WiFi network 512 and support the WiME functionalities. The offloaded traffic can be offloaded by the WiFi network 512 and passed to the WiFi operator core network 560 instead of the mobile operator core network 550, while enforcing policy and charging rules of the mobile operator core network 550.

Figure 6:
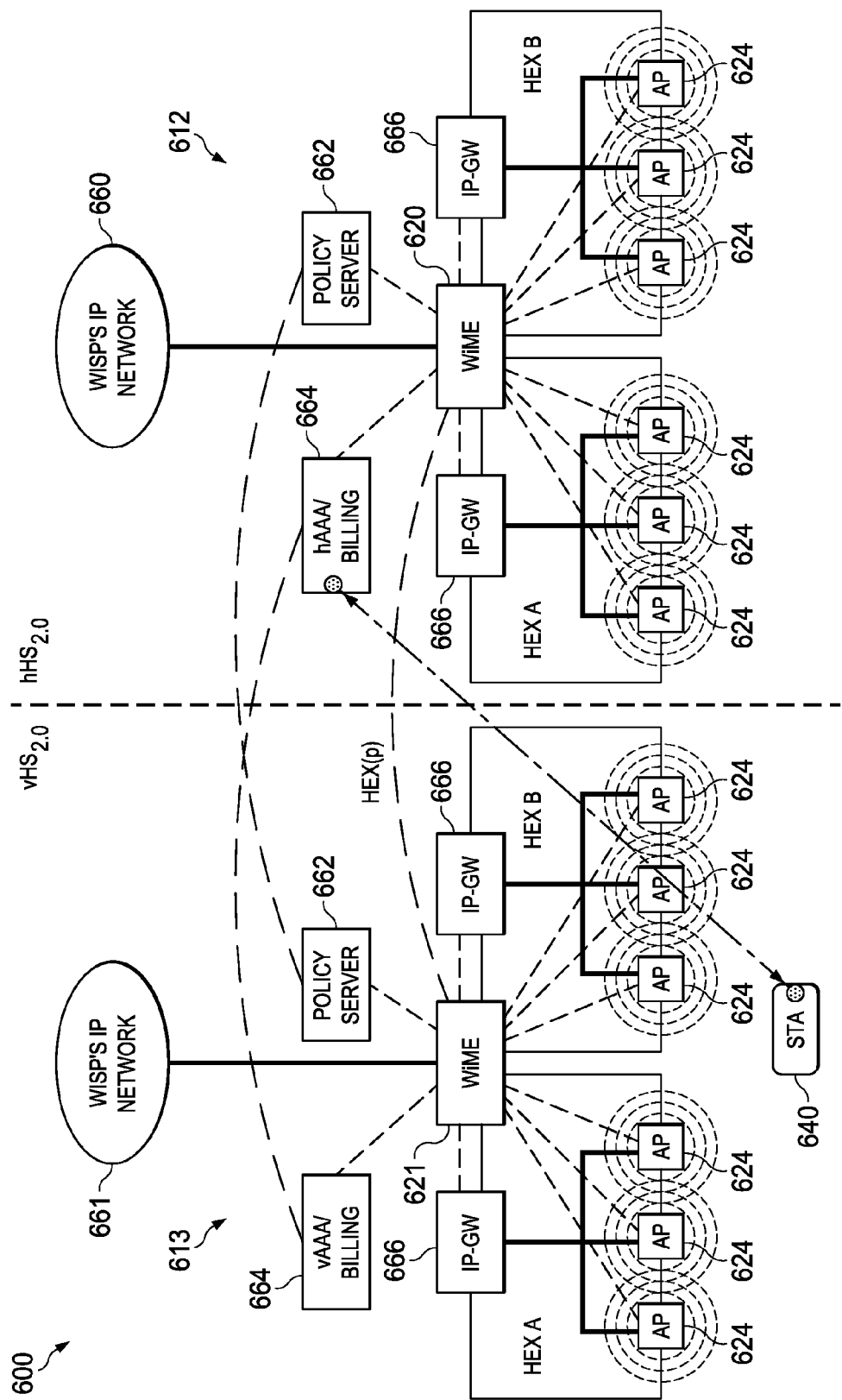
FIG. 6 illustrates an embodiment system for offloading traffic between public WiFi networks.

FIG. 6 illustrates an embodiment system 600 for offloading traffic between public WiFi networks based on the HEX architecture. The system 600 comprises one or more home WiFi networks 612 coupled to a wireless Internet service provider (WISP) network 660 (e.g., an IP network), and one or more visited WiFi networks 613 coupled to a second WISP network 661 (e.g., another IP network). For example, a home WiFi network 612 is a home HotSpot 2.0 (hHS 2.0) and a visited WiFi network 613 is a visited HotSpot 2.0 (vHS 2.0).

The home WiFi networks 612 comprise a first WiME 620 coupled to a policy server 662 and an AAA/Billing server 664. Each WiFi network 612 comprises a corresponding IP-GW 666 coupled to the first WiME 620 and APs 624 that can communicate with STAs 640. The visited WiFi networks 613 comprise a second WiME 613 coupled to another policy server 662 and an AAA/Billing server 664. Each second WiFi network 613 comprises a corresponding IP-GW 666 coupled to the second WiME 621 and APs 624 that can communicate with STAs 640.

The STAs 640 can access both the home WiFi networks 612 and the visited WiFi networks 613 (via the APs 624) to offload traffic between the WiFi networks. The traffic can be offloaded from a visited WiFi network 613 to a home WiFi network 612 and passed to the WISP network 660 instead of the second WISP network 661, while enforcing policy and charging rules of the second WISP network 661. Similarly, the traffic can be offloaded from a home WiFi network 612 to a visited WiFi network 613 and passed to the second WISP network 661 instead of the WISP network 660, while enforcing policy and charging rules of the WISP network 660.

Based on the HEX architecture, the first WiME 620 and the second WiME 621 act as anchor points for the home WiFi networks 612 and the visited WiFi networks 613, respectively. Each of the first WiME 620 and the second WiME 621 comprises an OpenFlow controller that communicate with the other controller and with other components using the HEX protocols to offload traffic between their respective networks and support the WiME functionalities above.

Figure 7:
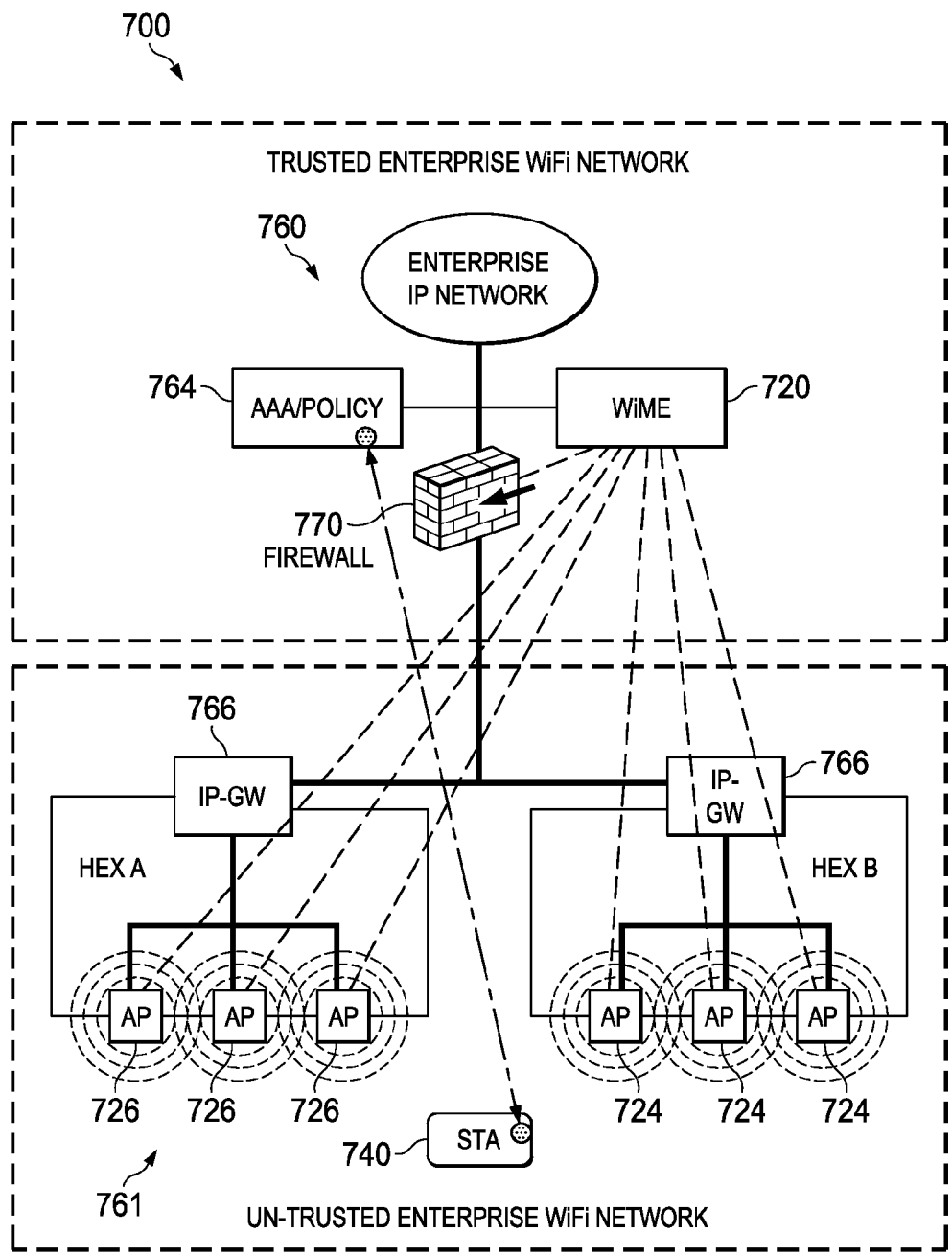
FIG. 7 illustrates an embodiment system for offloading traffic between Enterprise WiFi networks.

FIG. 7 illustrates an embodiment system 700 for offloading traffic between Enterprise WiFi networks based on the HEX architecture. The system 700 comprises a trusted Enterprise WiFi network 760 and one or more un-trusted Enterprise WiFi networks 761. The un-trusted Enterprise WiFi networks 761 communicate with the trusted Enterprise WiFi network 760 via a firewall 770 established for the trusted Enterprise WiFi network 760 for security and protection against unwanted access or harmful attacks. The trusted Enterprise WiFi network 760 comprises a WiME 720 and an AAA/Policy server 764. Each un-trusted Enterprise WiFi network 761 comprises a corresponding IP-GW 766 and APs 724 that can communicate with STAs 740.

The WiME 720 is configured to communicate behind the firewall 770 with the APs 724 and with other components to allow the STAs 740 to offload traffic between the different WiFi networks and support the WiME functionalities above. The WiME 720 comprises an OpenFlow controller that uses the HEX protocols to achieve such communications and functionalities. As such, the STAs 740 can offload their traffic without permission for accessing the firewall 770 to keep the trusted Enterprise WiFi network 760 secure against threats or unwanted access.

Figure 8:
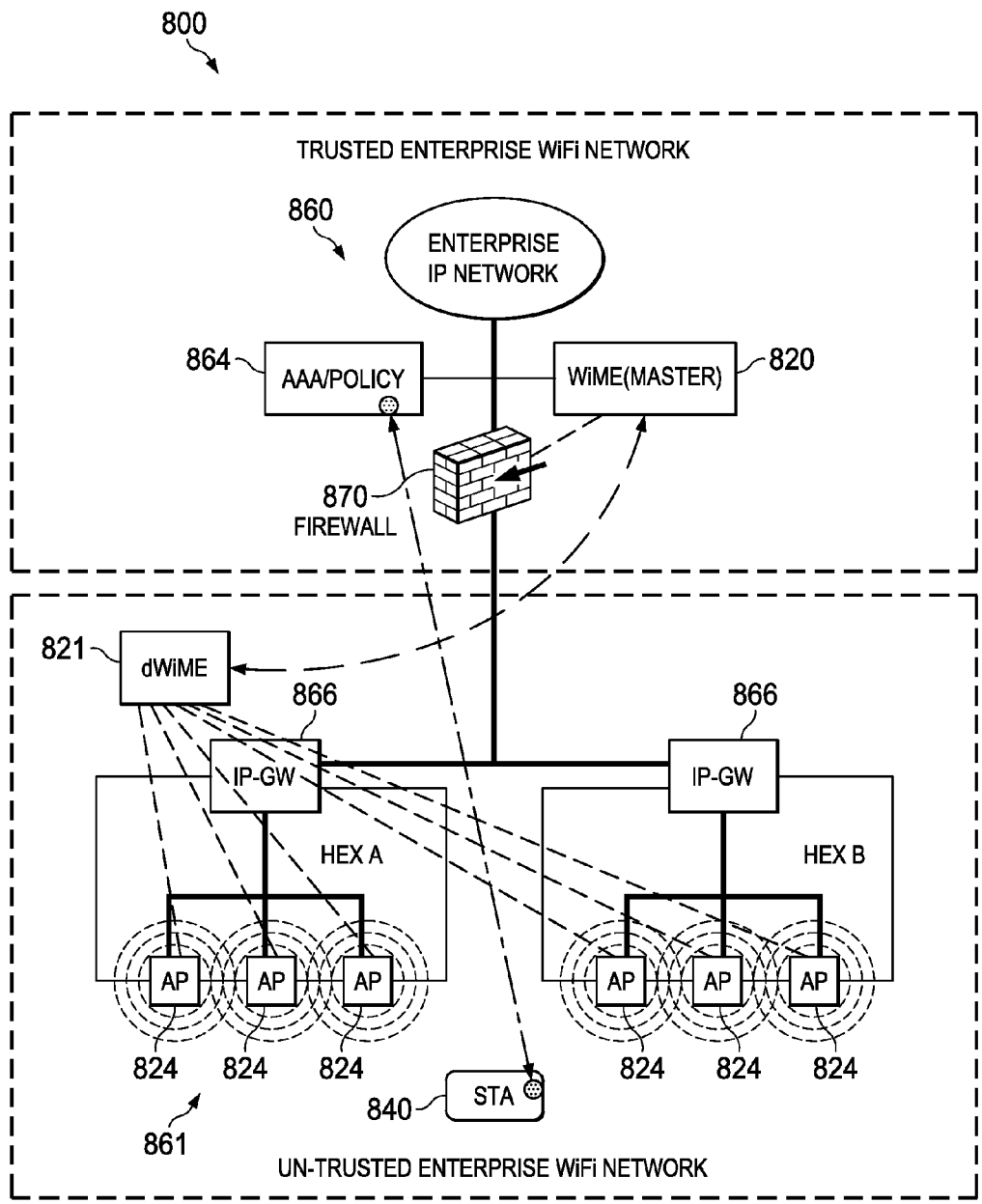
FIG. 8 illustrates another embodiment system for offloading traffic between Enterprise WiFi networks.

FIG. 8 illustrates another embodiment system 800 for offloading traffic between Enterprise WiFi networks based on the HEX architecture. The system 800 comprises a trusted Enterprise WiFi network system 860 and one or more un-trusted Enterprise WiFi networks 861. The un-trusted Enterprise WiFi networks 861 communicate with the trusted Enterprise WiFi network 860 via a firewall 870, similar to the system 700. The trusted Enterprise WiFi network 860 comprises a WiME 820 and an AAA/Billing server 864. Each un-trusted Enterprise WiFi network 861 comprises a corresponding IP-GW 866 and APs 824 that can communicate with STAs 840.

Additionally, the un-trusted Enterprise WiFi network 861 comprises a direct WiME (dWiME) 812 configured to communicate with the APs 824 and with the WiME 820 behind the firewall 870 to allow the STAs 840 to offload traffic between the different WiFi networks and support the WiME functionalities above. The dWiME 821 and the WiME 820 comprise OpenFlow controllers that communicate with each other and other components and use the HEX protocols. As such, the STAs 840 can offload their traffic without permission for accessing the firewall 870 and without directly communicating with the WiME 820 behind the firewall 870, which can provide more security than the system 700.

Figure 9:
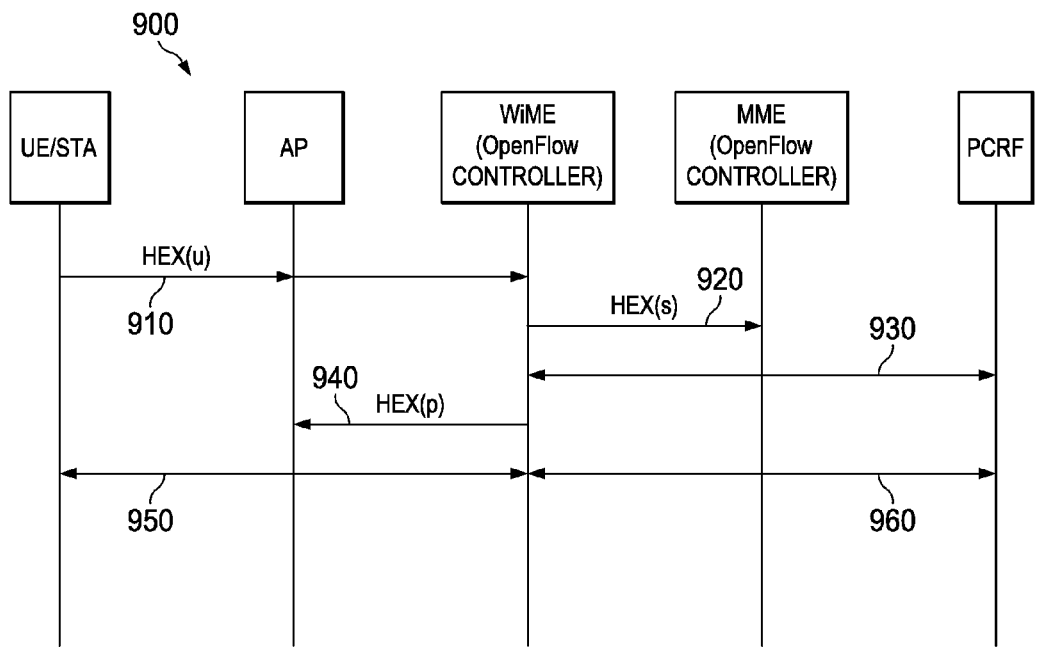
FIG. 9 illustrates an embodiment method for offloading traffic between wireless and WiFi networks.

FIG. 9 illustrates an embodiment method 900 for offloading traffic between wireless and WiFi networks based on the HEX architecture. The method 900 involves a WiME and a MME and can be used to offload UE/STA traffic from a cellular network to a WiFi network, such as in any of the systems 100-500. A similar method that involves two peer WiMEs at two different WiFi networks can also be used to offload traffic between the WiFi networks in any of the systems 600-800.

At step 910, a UE/STA attaches to an AP in a WiFi network to send/receive traffic, for example data traffic. The UE/SAT may be connected to a RAN in a cellular access network and connects to the AP to offload the data traffic to the WiFi network. Offloading the traffic may be triggered or initiated by the UE/STA or the wireless access network. When the UE/SAT attaches to the AP, the AP communicates in turn with the WiME associated with the wireless network to inform the WiME of the UE/SAT request. The AP can use a HEX protocol (HEX(u)) to communicate with the OpenFlow controller of the WiME to send the WiME information updates about the UE/STA. At step 920, the WiME communicates with the MME of the cellular access network to inform the MME about the UE/STA request and synchronize information about the UE/STA. The OpenFlow controller of the WiME can use a HEX protocol (HEX(s)) to communicate with an OpenFlow controller at the MME to achieve the synchronization between the two entities.

At step 930, the MME communicates with both a PCRF of the cellular access network or an associated mobile operator's core network and the WiME to enable enforcing the operator's policy and charging rulers on the UE/STA's traffic offloaded to the WiFi network. At step 940, the WiME communicates with the AP to provision the AP to begin a communication session with the UE/STA. The OpenFlow controller at the WiME can use a HEX protocol (HEX(p)) for provisioning the AP. At step 950, the AP initiates a communications session between the UE/STA and the WiFi network. At step 960, the OpenFlow controller of the MME communicates with both the OpenFlow controller of the WiME and the PCRF of the operator's core network to allow the operator to enforce the policy and charging rules on the offloaded traffic during the WiFi session of the UE/STA.

The method 900 allows the UE/STA to offload traffic in a smooth and intelligent manner, e.g., to achieve a seamless or non-seamless handover between the cellular access network and the WiFi network. Since the method 900 involves interactive communications between the different network components, control functions and rules can be adapted efficiently to different communication scenarios of the UE/STA, for example instead of using static configurations for offloading UE/STA traffic. The communications between the different components using the HEX protocols also enable the WiME to implement a plurality of optimized control, mobility, security, and other functionalities (as described above) in accordance with the UE/STA's communications and conditions.

Figure 10:
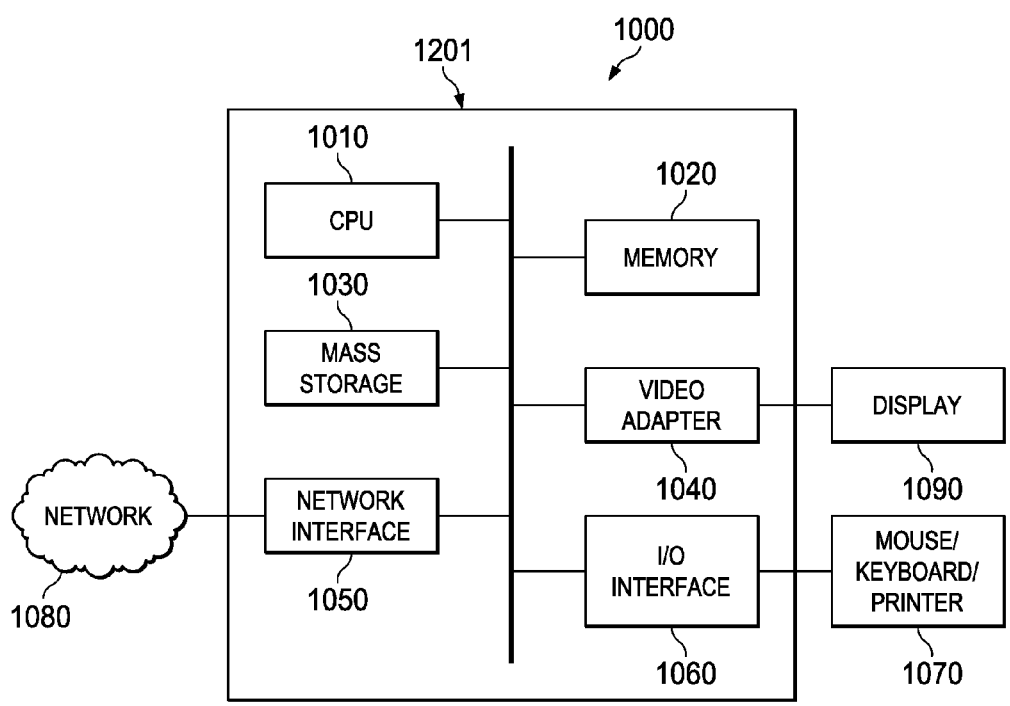
FIG. 10 is a block diagram of an embodiment communications device.

FIG. 10 is a block diagram of a processing system 1000 that can be used to implement various embodiments. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 1000 may comprise a processing unit 1001 equipped with one or more input/output devices, such as a speaker, microphone, mouse, touchscreen, keypad, keyboard, printer, display, and the like. The processing unit 1001 may include a central processing unit (CPU) 1010, a memory 1020, a mass storage device 1030, a video adapter 1040, and an I/O interface 1060 connected to a bus. The bus may be one or more of any type of several bus architectures including a memory bus or memory controller, a peripheral bus, a video bus, or the like.

The CPU 1010 may comprise any type of electronic data processor. The memory 1020 may comprise any type of system memory such as static random access memory (SRAM), dynamic random access memory (DRAM), synchronous DRAM (SDRAM), read-only memory (ROM), a combination thereof, or the like. In an embodiment, the memory 1020 may include ROM for use at boot-up, and DRAM for program and data storage for use while executing programs. In embodiments, the memory 1020 is non-transitory. The mass storage device 1030 may comprise any type of storage device configured to store data, programs, and other information and to make the data, programs, and other information accessible via the bus. The mass storage device 1030 may comprise, for example, one or more of a solid state drive, hard disk drive, a magnetic disk drive, an optical disk drive, or the like.

The video adapter 1040 and the I/O interface 1060 provide interfaces to couple external input and output devices to the processing unit. As illustrated, examples of input and output devices include a display 1090 coupled to the video adapter 1040 and any combination of mouse/keyboard/printer 1070 coupled to the I/O interface 1060. Other devices may be coupled to the processing unit 1001, and additional or fewer interface cards may be utilized. For example, a serial interface card (not shown) may be used to provide a serial interface for a printer.

The processing unit 1001 also includes one or more network interfaces 1050, which may comprise wired links, such as an Ethernet cable or the like, and/or wireless links to access nodes or one or more networks 1080. The network interface 1050 allows the processing unit 1001 to communicate with remote units via the networks 1080. For example, the network interface 1050 may provide wireless communication via one or more transmitters/transmit antennas and one or more receivers/receive antennas. In an embodiment, the processing unit 1001 is coupled to a local-area network or a wide-area network for data processing and communications with remote devices, such as other processing units, the Internet, remote storage facilities, or the like.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A network component comprising:
a WiFi management entity (WiME) configured to serve as an anchor point for a user device at a WiFi network and communicate with a management entity at a wireless network using OpenFlow protocol to handle a plurality of control and mobility functionalities for traffic in the WiFi network, wherein the management entity at the wireless network is a logically and physically separate management entity from the WiME at the WiFi network, and
wherein the control and mobility functionalities include offloading traffic for the user device from the wireless network to the WiFi network.

2. The network component of claim 1, wherein the WiME interacts with other network elements (NEs) using a protocol suite that enables an OpenFlow based WiME including a protocol for provisioning NEs (HEX(p)), a protocol for synchronizing NEs (HEX(s)), and a protocol for updating NEs (HEX(U)).

3. The network component of claim 1, wherein the WiME is further configured to enable the wireless network to implement a plurality of policy and charging rules on traffic for the user device offloaded from the wireless network to the WiFi network, and wherein the policy and charging rules are established by the wireless network's operator.

4. The network component of claim 1, wherein the WiME allows implementing the policy and charging rules without passing the offloaded traffic for the user device to the wireless network.

5. The network component of claim 1, wherein the management entity is a mobility management entity (MME) that serves as an anchor point for the user device at the wireless network, and wherein the wireless network is a cellular network.

6. The network component of claim 5, wherein the WiME is coupled to a plurality of attachment points (APs) via one or more first gateways in the WiFi network, and wherein the MME is coupled to a plurality of radio access networks (RANs) via one or more serving nodes in the cellular network and to a mobile operator core network via one or more second gateways.

7. The network component of claim 6, wherein the one or more first gateways are coupled to a WiFi operator core network and an Authentication, Authorization, and Accounting (AAA) and billing server associated with the WiFi operator core network, wherein the WiME is further configured to communicate with the AAA and billing server and a policy server associated with the WiFi operator core network, and wherein the MME and the one or more second gateways are configured to communicate with a Home Subscriber Server (HSS) and a policy and charging rules function (PCRF) associated with the mobile operator core network.

8. The network component of claim 6, wherein the one or more first gateways are coupled to the mobile operator core network, wherein the MME, the one or more second gateways, and the WiME are configured to communicate with a Home Subscriber Server (HSS) and a policy and charging rules function (PCRF) associated with the mobile operator core network.

9. The network component of claim 6, wherein the one or more first gateways are coupled to a WiFi operator core network and an Authentication, Authorization, and Accounting (AAA) and billing server associated with the WiFi operator core network, wherein the WiME is further configured to communicate with the AAA and billing server and a policy server associated with the WiFi operator core network, wherein the MME and the one or more second gateways are configured to communicate with a Home Subscriber Server (HSS) and a policy and charging rules function (PCRF) associated with the mobile operator core network, ands wherein the cellular network is a visited network and the mobile operator core network is a home network coupled to the visited network.

10. The network component of claim 6, wherein the MME is coupled to a plurality of radio access networks (RANs) via one or more serving nodes in the cellular network and to a mobile core network via one or more gateways, wherein the WiFi network is integrated as part of the cellular network and coupled to a plurality of attachment points (APs) via the one or more serving nodes, wherein the MME, the one or more gateways, and the WiME are configured to communicate with a Home Subscriber Server (HSS) and a policy and charging rules function (PCRF) associated with the mobile operator core network.

11. The network component of claim 1, wherein the management entity is a second WiME that serves as an anchor point for the wireless network, and wherein the wireless network is a second WiFi network.

12. The network component of claim 11, wherein the WiME is coupled to a plurality of first attachment points (APs) via one or more first gateways in the WiFi network and to a first WiFi operator core network, to an Authentication, Authorization, and Accounting (AAA) and billing server, and to a policy server, and wherein the second WiME is coupled to a plurality of second APs via one or more second gateways in the second WiFi network and to a second WiFi operator core network, to a second AAA/billing server that communicates with the AAA/billing server, and to a second policy server that communicates with the policy server.

13. The network component of claim 1, wherein offloading traffic for the user device is adaptive to communications and conditions of the user device.

14. The network component of claim 1, wherein the WiME is collocated with an attachment point (AP) that communicates with the user device in the WiFi network.

15. The network component of claim 1, wherein the WiME implements the control and mobility functionalities at a Media Access Control (MAC) layer and is coupled to an attachment point (AP) that handles traffic transfer for the user device at a physical (PHY) layer, and wherein the AP communicates with the WiME to transfer the traffic in accordance with the control and mobility functionalities.

16. A network component comprising:
 a management entity configured to serve as an anchor point for a user device at a wireless network and communicate with a WiFi management entity (WiME) at a WiFi network using OpenFlow protocol to handle a plurality of control and mobility functionalities for traffic in the WiFi network, wherein the management entity at the wireless network is a logically and physically separate management entity from the WiME at the WiFi network, and
 wherein the control and mobility functionalities include offloading traffic for the user device from the wireless network to the WiFi network.

17. The network component of claim 16, wherein the management entity is a mobility management entity (MME) that serves as an anchor point for the user device at the wireless network, and wherein the wireless network is a cellular network.

18. The network component of claim 16, wherein the management entity is a second WiME that serves as an anchor point for the wireless network, and wherein the wireless network is a second WiFi network.

19. A method implemented at a WiFi management entity (WiME) for managing traffic in one or more wireless networks, the method comprising:
 receiving via OpenFlow protocol update information from a user device to start a communication session with a WiFi network, wherein the user device was in communications with a wireless network;
 exchanging via the OpenFlow protocol synchronization information with a management entity in the wireless network to offload communications for the user device from the wireless network; and
 sending via the OpenFlow protocol provisioning information to an attachment point (AP) in the WiFi network to configure the AP to handle the communication session for the user device.

20. The method of claim 19, wherein the synchronization information instructs the wireless network to terminate transfer of traffic for the mobile device in the wireless network, and wherein the provisioning information instructs the AP to begin transferring the traffic in the WiFi network.

21. The method of claim 20 further comprising passing the traffic through the WiFi network to an IP network to offload the traffic from a mobile operator network coupled to the wireless network.

22. The method of claim 21 further comprising communicating via the OpenFlow protocol with at least one of a policy server, a charging server, an authentication and authorization server associated with the mobile operator network to apply corresponding rules on the traffic passed through the WiFi network to the IP network.

23. The method of claim 21, wherein the traffic is offloaded from the mobile operator network and transferred in the WiFi network without using pre-determined static configurations.

24. The method of claim 21, wherein offloading the traffic from the mobile operator network is triggered by the mobile operator network or the wireless network.

25. The method of claim 21, wherein offloading the traffic from the mobile operator network is triggered by the user device.

26. The network component of claim 19, wherein the WiME communicates with the AP using the OpenFlow protocol and control and provisioning of wireless access points (CAPWAP) protocol.

* * * * *